Patented May 23, 1933

1,910,297

UNITED STATES PATENT OFFICE

WALTER KIRCHNER, OF BERLIN-GRUNAU, GERMANY, ASSIGNOR TO CHEMISCHE FABRIK GRUNAU, LANDSHOFF & MEYER AKTIENGESELLSCHAFT, OF BERLIN-GRUNAU, GERMANY

METHOD FOR IMPROVING CEMENT AND CEMENT MORTAR, AND PRODUCT THEREOF

No Drawing. Application filed November 16, 1931, Serial No. 575,471, and in Germany February 17, 1931.

This invention relates to a method for improving cement and cement mortar.

It is known to influence the properties of the cement in one or other direction by the addition of certain salts to the cement during its production or working. For example chlorides, nitrates, soluble carbonates and bicarbonates have been employed as such addition substances.

This invention relates to a method, according to which also certain additions are made to the cement or cement mortar, said method rendering it possible to accelerate or regulate as desired the setting or hardening capability of the cements and at the same time to increase the density and resisting properties of the cements.

The method according to the invention consists in adding to the cement cement-mortar or concrete, sulpho hydrocyanic acid (HCNS) or salts of this acid in any stage of its production or during the working thereof. The improving media become particularly apparent in cements with a high percentage of lime; they work however also to a high degree in cements with lower percentage of lime.

The method according to the invention is technically particularly valuable, because the sulpho-cyanic acid salts coming chiefly into question are distinguished by easy solubility, so that the working thereof in the cement and the uniform distribution in the mortar or concrete is ensured.

The sulphocyanic acid salts, for example the sulpho cyanides of ammonium, calcium, potassium, barium, aluminium, iron, chrome and the like may be allowed to act on cements singly as well as in most various combinations and different effects are thus obtained according to the kind of salt or combination selected. Thus, it is possible for example by employing aluminium sulphocyanide or barium sulphocyanide to obtain considerable densifying effects on cement.

Moreover it has been found that the sulphocyanides can be also mixed with other salts, such as chlorides, nitrates and the like, so that in this instance by the combined employment of suitable salts or groups of salts their influence on cements can be regulated as desired.

The effect of the calcium sulphocyanide for example becomes characteristically apparent during the setting period. The setting time of a Portland cement can be reduced from 6 or 7 hours to about 10 to 20 minutes by the addition of a 21° Bé. aqueous solution of the calcium salt as mixing liquid.

With the same solution the setting time of a ferro Portland cement is reduced from 8 hours to about 23 minutes.

A great reduction of the setting time also occurs, when employing the solution of the aluminium salt, and at the same time is accompanied by a strong increase of temperature (when employing a 21° Bé. solution the temperature is increased up to 63° C.), this being very important for open air work in frosty weather.

When employing a mixture of calcium salt and aluminium salt in a proportion of 1:1, it is possible to reduce the setting time to a few mintues, for example to about 5 minutes. A temperature increase of about 40° C. then occurs. The particularly good constancy of volume of the cement mortar or concrete is worthy of particular mention.

For the aluminium sulphocyanide in the mixture aluminium chloride or nitrate may be substituted or inversely the calcium sulphocyanide may be replaced by corresponding chlorides or nitrates. Combinations of chlorides with sulphocyanides containing the same cations give corresponding effects. A mixture of sulphocyanide with calcium chloride or calcium nitrate and aluminium chloride or aluminium nitrate may be mentioned as particularly effective.

The easy solubility of the barium sulphocyanide also enables this salt to be employed to an ample extent both alone and in combination. In this instance an acceleration of the setting or hardening can be determined, but considerable densifying effects are above all remarkable.

The sulphocyanides of chromium, magnesium and the like act in a similar manner.

The above mentioned salts or salt mixtures may be added during the process of producing the cement or only during the working of same to mortar or concrete. The employment of a mixing liquid, in which the salts or salt mixtures are dissolved has already been mentioned above.

I claim:—

1. A method for improving the properties of hydraulic binding media comprising adding sulpho-hydrocyanic acid to hydraulic binding media before hardening.

2. A method for improving the properties of hydraulic binding media, comprising adding sulpho-hydrocyanic acid in bound form to hydraulic binding media before hardening.

3. A method for improving the properties of hydraulic binding media, comprising adding a mixture of sulpho-hydrocyanic acid and a salt of other strong mineral acid to hydraulic binding media before hardening.

4. A method for improving the properties of hydraulic binding media, comprising adding a mixture of a plurality of salts, at least one of which contains as anion the sulphocyanide radical (CNS) and at least another of which contains as anion the negative radical of another strong mineral acid to hydraulic binding media before hardening.

5. A method for improving the properties of hydraulic binding media, comprising adding a mixture of substances containing sulpho-hydrocyanic acid and several salts, at least one of which has as anion the sulphocyanide radical (CNS), and at least another of which contains as anion the negative radical of another strong mineral acid, to hydraulic binding media before hardening.

6. A method for improving the properties of hydraulic binding media, comprising adding calcium sulphocyanide to hydraulic binding media before hardening.

7. A method for improving the properties of hydraulic binding media, comprising adding aluminum sulphocyanide to hydraulic binding media before hardening.

8. A method for improving the properties of hydraulic binding media, comprising adding a mixture of calcium sulphocyanide and aluminum sulphocyanide to hydraulic binding media before hardening.

9. A method for improving the properties of hydraulic binding media, comprising adding a mixture of calcium sulphocyanide and a soluble calcium salt of another strong mineral acid to hydraulic binding media before hardening.

10. A method for improving the properties of hydraulic binding media, comprising adding a mixture of aluminum sulphocyanide and a soluble aluminum salt of another strong mineral acid to hydraulic binding media before hardening.

11. A method for improving the properties of hydraulic binding media, comprising adding a mixture of several salts, having as anions the negative radical of sulpho-hydrocyanic acid and the negative radical of hydrochloric acid to hydraulic binding media before hardening.

12. A method for improving the properties of hydraulic binding media, comprising adding a mixture of several salts, having as anions the negative radical of sulpho-hydrocyanic acid and the negative radical of nitric acid to hydraulic binding media before hardening.

13. A method for improving the properties of hydraulic binding media, comprising adding a mixture of several salts having as anion the negative radicals of sulpho-hydrocyanic acid, hydrochloric acid and nitric acid to hydraulic binding media before hardening.

14. A method for improving the properties of hydraulic binding media, comprising adding a mixture of two salts, one of which containing calcium and the other aluminum as cation, whereas the negative radicals of sulpho-hydrocyanic acid and hydrochloric acid are present as anions to hydraulic binding media before hardening.

15. A method for improving the properties of hydraulic binding media, comprising adding a mixture of two salts, one of which contains calcium and the other aluminum as cation, whereas the negative radicals of sulpho-hydrocyanic acid and nitric acid are present as anions to hydraulic binding media before hardening.

16. As a new product of manufacture, a hydraulic binding material containing sulpho-hydrocyanic acid.

17. As a new product of manufacture, a hydraulic binding material containing sulpho-hydrocyanic acid and a salt of a strong mineral acid.

18. As a new product of manufacture, a hydraulic binding material containing sulpho-hydrocyanic acid and a plurality of salts at least one of which has as anion the sulpho-hydrocyanic radical (CNS), and at least another of which contains as anion the negative radical of a strong mineral acid.

19. As a new product of manufacture, a hydraulic binding material containing a salt of sulpho-hydrocyanic acid.

20. As a new product of manufacture, a hydraulic binding material containing a plurality of salts at least one of which contains as anion the sulpho-hydrocyanic radical (CNS) and at least one other of which contains as anion the negative radical of a strong mineral acid.

21. As a new product of manufacture, a hydraulic binding material containing calcium sulphocyanide.

22. As a new product of mancfacture, a hydraulic binding material containing aluminum sulphocyanide.

23. As a new product of manufacture, a hydraulic binding material containing calcium sulphocyanide and aluminum sulphocyanide.

24. As a new product of manufacture, a hydraulic binding material containing salts having as cations calcium and aluminum, and as anions the sulpho-hydrocyanic radical (CNS) and the negative radical of a strong mineral acid.

25. As a new product of manufacture, a hydraulic binding material containing sulpho-hydrocyanic acid and a salt of this acid.

In testimony whereof, I affix my signature.

WALTER KIRCHNER.